Jan. 20, 1953 W. J. O'BRIEN 2,626,392
RADIO DIRECTION INDICATING SYSTEM
Filed Feb. 7, 1947 5 Sheets-Sheet 3

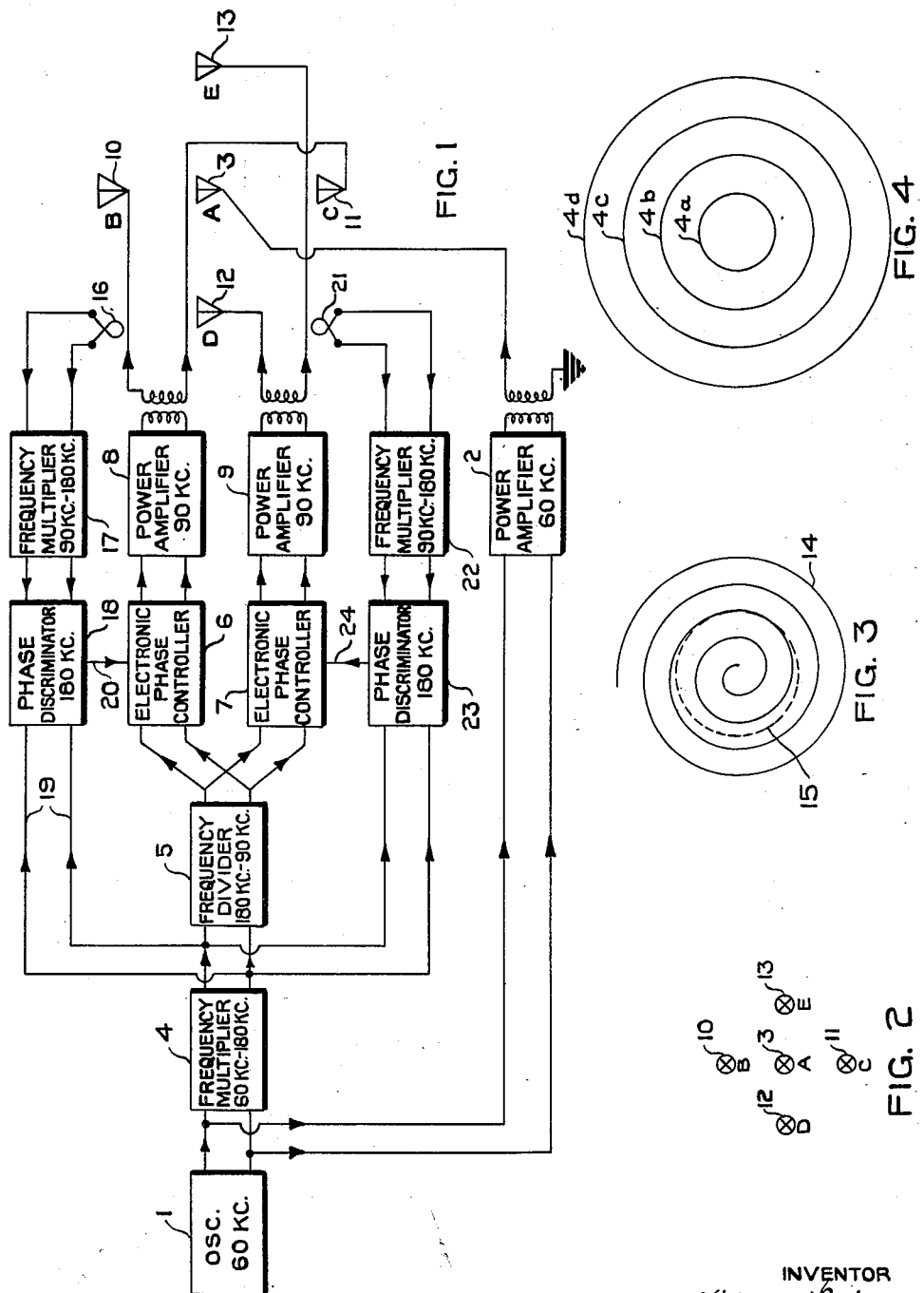

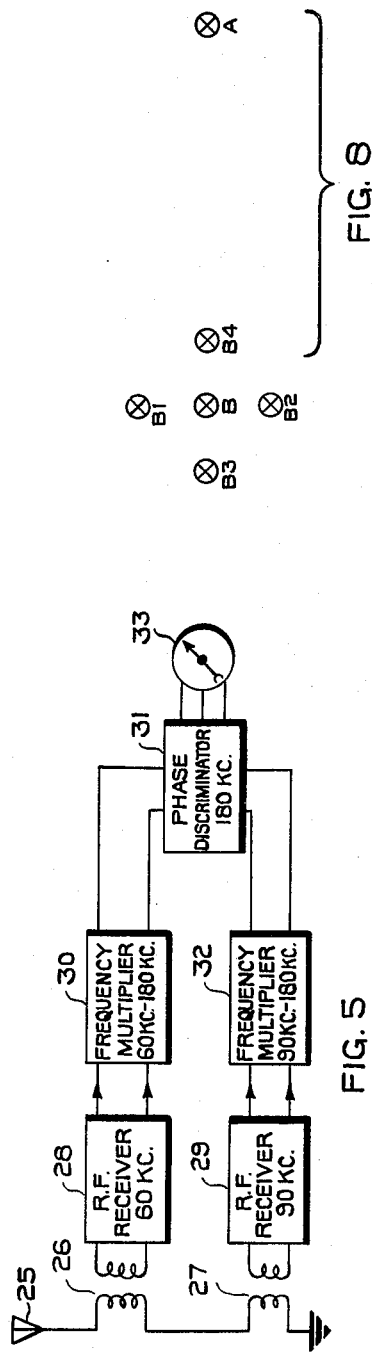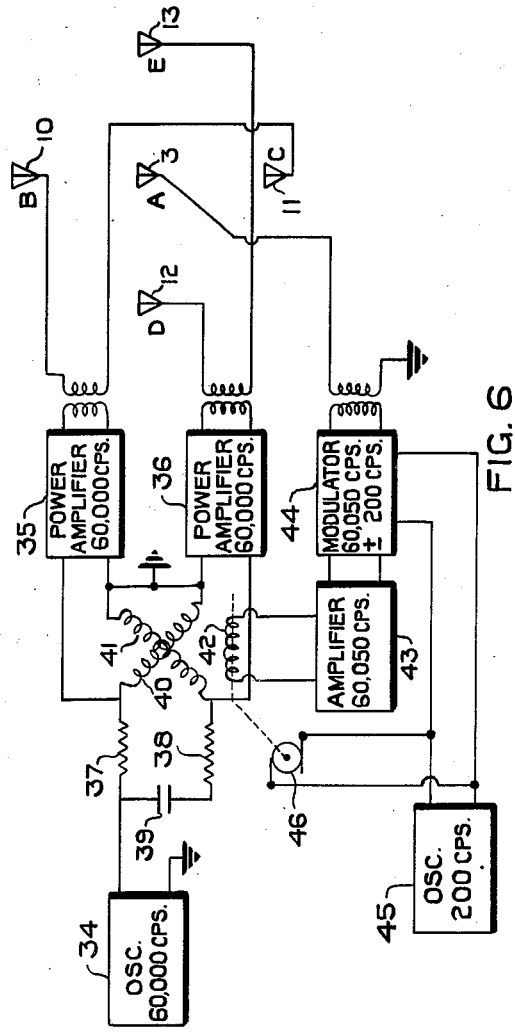

INVENTOR
William J. O'Brien

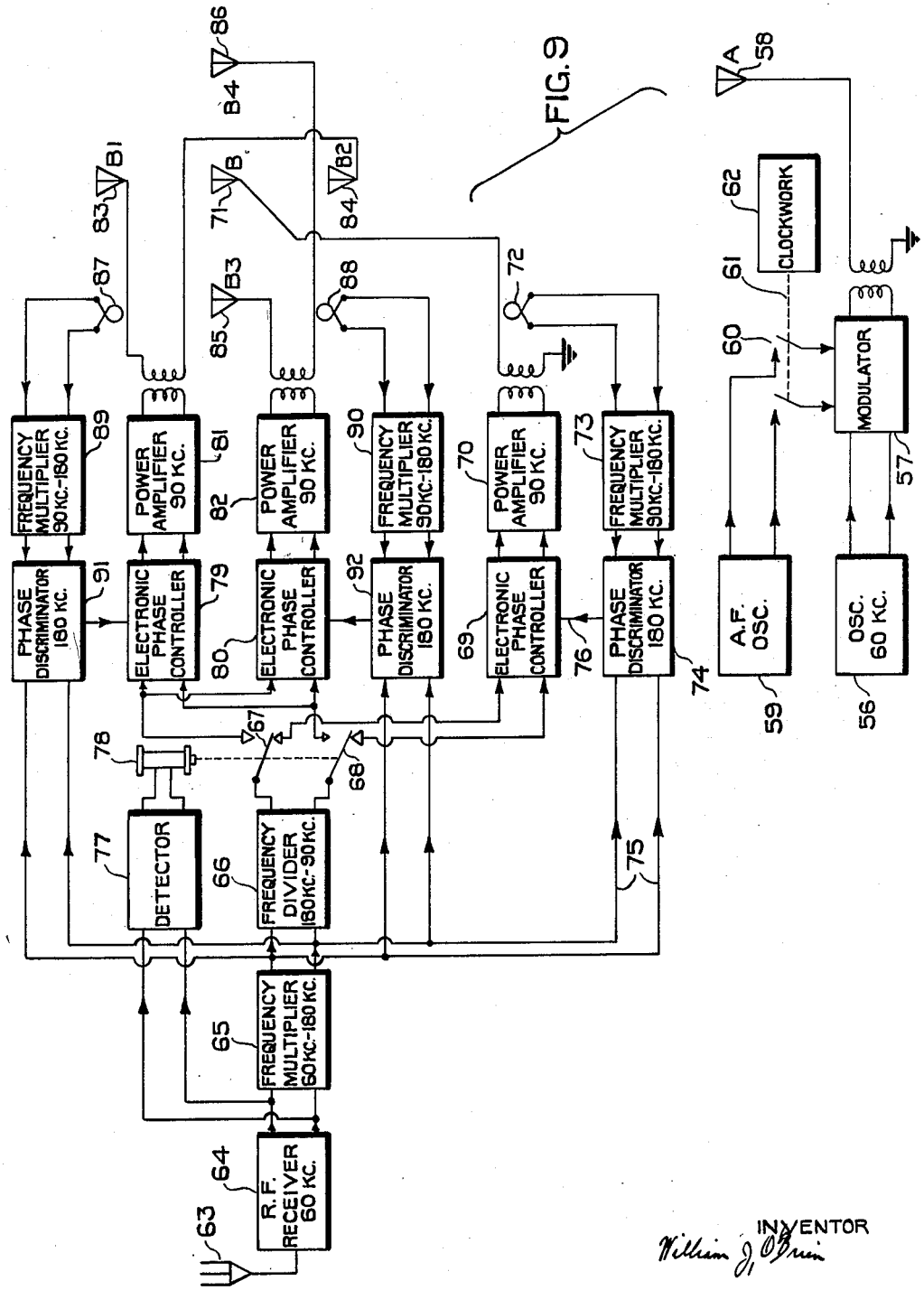

Patented Jan. 20, 1953

2,626,392

UNITED STATES PATENT OFFICE 2,626,392

RADIO DIRECTION INDICATING SYSTEM

William J. O'Brien, London, England, assignor to The Decca Record Company, Limited, London, England, a corporation of Great Britain Application February 7, 1947, Serial No. 727,233
In Great Britain February 6, 1946

Section 1, Public Law 690, August 8, 1946
Patent expires February 6, 1966

8 Claims. (Cl. 343—105)

My invention relates to radio direction indicating systems and has particular reference to a system for use as or in connection with radio aids for the navigation of mobile vehicles.

In my co-pending applications, Serial No. 701,745, now Patent No. 2,582,350, and 701,746, now Patent No. 2,430,244, each filed October 7, 1946, and entitled Radio Beacon Systems, I have shown how field contours of equal phase displacement may be generated as a pattern which is fixed in geographical orientation and how these contours may be used for guiding mobile vehicles.

In my co-pending application Serial No. 612,987, filed August 27, 1945, now abandoned, and entitled Navigation System, I have shown how such equi-phase displacement field contours may be used to indicate continuously in a mobile vehicle the instantaneous geographical position of the vehicle. In systems of the character above mentioned, a determination of the vehicle's position is effected by measuring the phase relation at the location of the vehicle of simultaneously radiated radio frequency signals.

The amount of phase displacement encountered by a mobile vehicle in circumnavigating the transmitting equipment will be two or more full electrical circles or "lanes," depending upon the frequency at which the phase measurement is made and the distance of separation of the transmitting antennae.

In the interests of high sensitivity and accuracy, it is often desirable to so arrange the system as to generate a relatively large number of lanes to thereby obtain a relatively large change in phase for a relatively small distance of movement of the mobile vehicle.

The use of a large number of lanes introduces correspondingly large ambiguities in the determination of the position of the mobile vehicle, for the reason that a given phase relation in one lane also exists in all other lanes.

The present invention is directed to a method and apparatus by which a less sensitive and less ambiguous determination is given either simultaneously, or alternatively with the determination effected by the normal equi-phase displacement system to thereby identify the particular lane to which a given phase determination relates.

Prior lane identifying systems of which I have knowledge, operate to establish alternative field patterns, but these alternative patterns are equi-phase displacement patterns differing from the normal pattern only in the number of lanes embraced thereby and in their geographical orientation. The present invention provides for alternatively and relatively roughly determining the location of the mobile vehicle independently of the equi-phase displacement pattern by determining the compass bearing of one or more of the known transmitter locations from the then position of the vehicle.

Since the present invention provides an alternative manner of determining the position of a mobile vehicle independently of the operation of the normal equi-phase displacement system, the invention may also be considered as directed to a direction indicating or navigational system per se.

It is therefore an object of my invention to provide a method and apparatus for indicating at the location of a mobile vehicle the compass bearing of a transmitting apparatus of known location.

It is also an object of my invention to provide a method and apparatus of the character above described in which the bearing is obtained by measuring the phase relation at the vehicle between a circular phase field and a spiral phase field.

It is an additional object of my invention to provide a transmitting apparatus for generating a radio frequency field in which the locus of points of a given absolute phase is in the form of a spiral.

It is an other object of my invention to provide a method and apparatus of the character hereinbefore described which is susceptible to use with an equi-phase displacement system for the purpose of reducing the ambiguity of such a system.

It is also an object of my invention to provide a method and apparatus of the character set forth in the preceding paragraphs in which the circular and spiral phase fields are concentrically disposed.

Other objects and advantages of my invention will be apparent from a consideration of the following specification read in connection with the accompanying drawings, wherein:

Fig. 1 is a block diagram illustrating the transmitting apparatus employed for producing superimposed circular and spiral phase field patterns;

Fig. 2 is a diagram representing in plan view the relative locations of the transmitting antennae;

Fig. 3 is a diagram representing in plan view a spiral phase field pattern developed by the transmitting apparatus of Fig. 1;

Fig. 4 is a view similar to Fig. 3 but illustrating the nature of the circular phase field pattern;

Fig. 5 is a block diagram illustrating a receiving apparatus suitable for use as a mobile receiver for receiving the transmissions from a transmitting apparatus such as that shown in Fig. 1;

Fig. 6 is a block diagram illustrating a different type of transmitting apparatus for producing superimposed circular and spiral phase field patterns;

Fig. 8 is a diagram representing in plan view an arrangement of transmitting antennae which may be used in the employment of a circular phase field pattern as a means for identifying lanes generated in a normal, equi-phase displacement system;

Fig. 9 is a block diagram illustrating master and slave transmitting equipment for use with the antennae arrangement shown in Fig. 8;

Figure 7:
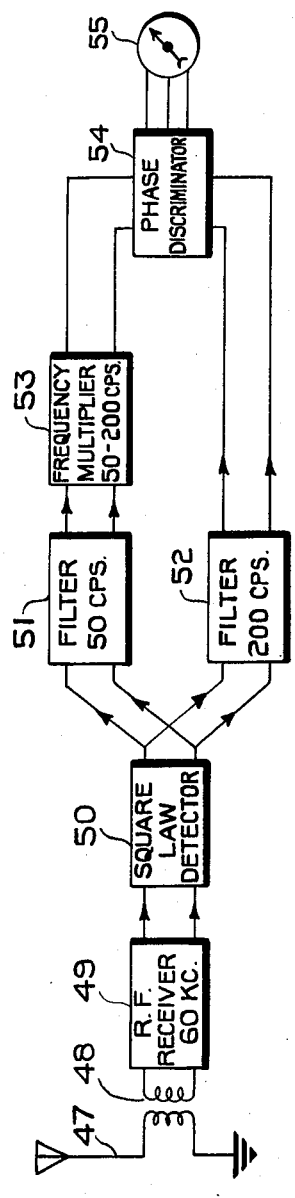
Fig. 7 is a block diagram illustrating a mobile receiving apparatus particularly adapted for use with a transmitting apparatus of the character shown in Fig. 6.

In obtaining a "fix" or determining the location of a vehicle, the point of location may be considered as defined by two intersecting lines of position. Thus any system which is capable of defining a line of position passing through the location of the vehicle is susceptible to positively fixing the location of the vehicle by merely duplicating the apparatus to the extent required to define a second line of position also passing through the vehicle's location and disposed angularly with respect to the first mentioned line of position.

Accordingly, while for the purposes of simplification the ensuing description has been limited to apparatus for defining a line of position passing through the location of the mobile vehicle, it falls within the scope of this invention to employ additional equipment of the same character for establishing and defining another line of position through the vehicle's location to thereby provide a positive fix as to the vehicle's geographical location.

Referring to the drawings, I have illustrated in Fig. 1 by means of a block diagram, apparatus which may be employed for generating a spiral phase field pattern and a superimposed circular phase field pattern. As will be explained hereinafter, the bearing of the transmitting equipment from the location of a mobile receiver is obtained by measuring at the location of the receiver the phase relation between the spiral phase pattern and the circular phase pattern. In order to facilitate the separate reception of the signals forming each of the patterns, the signals are radiated at different but harmonically related frequencies, by which I mean that the frequencies of the signals of the two patterns are different but are both harmonics of a given fundamental frequency. For the purposes of illustration herein, it has been assumed that the circular phase field pattern is generated by signals for a frequency of 60 kilocycles, while the spiral phase field pattern is generated by signals having a frequency of 90 kilocycles, these frequencies representing respectively the second and third harmonics of a 30 kilocycle fundamental frequency.

For the purpose of generating a circular phase field pattern, I employ a source of 60 kilocycle alternating potential such as a 60 kilocycle oscillator 1, the output of which is applied to a 60 kilocycle power amplifier 2. The power amplifier 2 is coupled in the conventional manner to a suitable transmitting antenna 3 situated at a known location hereinafter designated as location A. The field pattern which is produced by the radiation of 60 kilocycle signals from antenna 3 may be represented by a diagram such as Fig. 4, in which the concentric circles 4a, 4b, etc., represent the loci of points of like phase. The diagram of Fig. 4 is susceptible to two interpretations: if the concentric circles are representative of the loci of all points of like and given absolute phase relation, then the diagram is continually expanding at the speed of light with the fixed radial distance between adjacent circles equal to one wavelength of the transmitted signal. If, on the other hand, the concentric circles are considered as the loci of all points of phase equality with the absolute phase of the signals at the location of the transmitting antennae, then the circles are of fixed diameter and location and the spacing between adjacent circles is equal to one wavelength of the transmitted signal.

For the generation of the spiral phase field pattern, I apply a portion of the output of the 60 kilocycle oscillator 1 to a frequency multiplier 4, which functions to produce an output signal of 180 kilocycles. The 180 kilocycle signal is applied to a frequency divider circuit 5 which in turn produces an output signal having a frequency of 90 kilocycles. The 90 kilocycle output signal is divided and applied to two electronic phase controllers 6 and 7, the output of which is applied to 90 kilocycle power amplifiers 8 and 9. The output of the power amplifier 8 is coupled to transmitting antennae 10 and 11 situated at locations hereinafter designated as locations B and C. Similarly, the 90 kilocycle output of the power amplifier 9 is applied to transmitting antennae 12 and 13 situated at locations hereinafter designated as D and E. The relative positioning of the locations A, B, C, D and E is represented in Fig. 2. Locations B and C are on a line passing through location A and are positioned on opposite sides of location A. Locations D and E are situated on a line also passing through location A but disposed at right angles to the line BC, locations D and E being positioned on opposite sides of location A and spaced therefrom the same distance as are B and C. The spacing between locations B and C and between locations D and E should be less than one quarter of a wavelength of the signals transmitted from the four outer locations. With the transmitting apparatus arranged as described, the instantaneous phase of the signals radiated from location B will be in opposition to the instantaneous phase of the signals radiated from location C. A similar phase opposition relation exists between the signals radiated from locations D and E. Furthermore, the phase relation between the output signals from the power amplifiers 8 and 9 is so adjusted that the signals from locations D and E bear a phase quadrature relation to the signals radiated from the locations B and C.

When the above described conditions of operation obtain, there results a spiral phase field pattern such as that represented by the solid line 14 in Fig. 3. As was the case with Fig. 4, Fig. 3 is susceptible to two interpretations: if the line 14 represents the locus of all points of like absolute phase, then the spiral pattern rotates at the frequency of the signals radiated from the transmitting antennae so that the pattern expands outwardly at the speed of light, the spacing between adjacent convolutions of the spiral being equal to one wavelength of the transmitted signal. On the other hand, if the line 14 represents the locus of all points of a like and given phase relative to the instantaneous phase of the signals at the transmitting antennae, then the pattern 14 is stationary and the spacing between adjacent convolutions of the spiral is equal to one wavelength of the transmitted signal.

As may be seen by inspection of Fig. 3, the instantaneous phase of received signals at any location relative to the phase of the signals at the transmitting antenna is a function both of the distance from the receiver to the transmitting station and of the bearing of the transmitting station from the receiver. This may be observed by reference to the dotted circle 15 in Fig. 3. It will be seen that if a receiver be moved along the dotted circle 15, the phase relation of the received signals would undergo a change which is proportional to the angular movement of the receiver, which amounts to one full electrical circle for one full revolution of the receiver about the transmitter. On the other hand, a receiver moving within the circular phase field pattern of Fig. 4, as for example by moving about the circle 4b, would experience no phase change whatever. Accordingly if at the receiver location one determines the relative phase relation between the signals comprising a circular phase field pattern and those comprising the spiral phase field pattern, the determined phase relation becomes a measure of the bearing of the transmitting apparatus from the then location of the receiver.

It will be appreciated that in order for the above mentioned phase measurement to be truly indicative of the bearing, it is necessary that the signals of the circular phase field pattern and the signals of the spiral phase field pattern be held in a fixed and unchanging phase relation with respect to each other. To this end I employ a pick up loop 16 which picks up a small portion of the 90 kilocycle energy fed to antennae 10 and 11. The 90 kilocycle signal picked up by the pick up loop 16 is fed to a frequency multiplier 17 serving to produce a 180 kilocycle output signal, which is applied to one input circuit of a phase discriminator 18, the other input circuit of the phase discriminator 18 being connected to the output circuit of the frequency multiplier 4 as is represented at 19. The phase discriminator 18 may be of any suitable type but is preferably constructed along the lines described in my copending application Serial No. 612,991, now Patent No. 2,500,200, filed August 27, 1945, and entitled Multiple Channel Radio Frequency Receiver. A discriminator of the type disclosed therein operates to compare the phase of two input signals of like frequency and develop a control potential, the magnitude of which is proportional to the phase of the input signals.

In the case of the phase discriminator 18, the control potential produced thereby is applied as indicated at 20 to the electronic phase controller 6 to thereby shift the phase of the signals passed through the phase controller 6 in response to changes in the actuating control potential in such direction as to oppose those phase shifts which caused the change in control potential.

The electronic phase controllers 6 and 7 may be of any suitable type but are preferably constructed in accordance with the disclosure contained in my co-pending application Serial No. 612,985, filed August 27, 1945, now abandoned, and entitled Radio Frequency Transmission Apparatus.

The apparatus thus operates to maintain a constant phase relation between the two 180 kilocycle input signals of the phase discriminator 18 and in so doing, operates to maintain a fixed and unchanging multiple phase relation between the 60 kilocycle signals radiated from antenna 3 at location A and the 90 kilocycle signals radiated from antennae 10 and 11 at locations B and C.

A similar arrangement including a pick up loop 21, frequency multiplier 22 and phase discriminator 23, coupled to the electronic phase adjuster 7 in the manner indicated at 24 serves to maintain a fixed and unchanging multiple phase relation between the 60 kilocycle signals radiated from antenna 3 and the 90 kilocycle signals radiated from antennae 12 and 13 at locations D and E.

The above described phase control apparatus serves to maintain the circular and spiral phase field patterns illustrated in Figs. 3 and 4 fixed with respect to each other so that measurements of phase relation between these two sets of signals are truly representative of the bearing of the transmitting apparatus from the mobile receiver.

It will be appreciated that since the spiral and circular field patterns are actually generated by signals of different frequency, it is necessary to convert the respective signals after reception to a common frequency in order that the phase relation may be measured. This may be accomplished by means of a receiving apparatus such as is illustrated in Fig. 5. The receiving apparatus shown therein comprises a single receiving antenna 25 coupled as indicated at 26 and 27 to two radio frequency receivers 28 and 29, tuned respectively to the 60 and 90 kilocycle signals radiated by the transmitting system.

The 60 kilocycle output of the receiver 28 is applied to a frequency multiplier 30 to produce a 180 kilocycle output signal which is applied to one input circuit of a phase discriminator 31. The other input circuit of the phase discriminator 31 is coupled to the output circuit of a frequency multiplier 32 which is connected to the output of the 90 kilocycle receiver 29 and which serves to convert the 90 kilocycle receiver output signal to a second 180 kilocycle signal, which is applied to the second input circuit of the discriminator 31. To the phase discriminator 31 there is connected a goniometer or phase indicating meter 33 which so co-operates with the phase discriminator 31 as to indicate directly the phase relation between the two 180 kilocycle signals which are applied to the input of the discriminator.

The phase discriminator 31 is preferably constructed along the lines disclosed in my aforementioned co-pending application, Serial No. 612,991, and is connected as shown therein to a phase indicating meter of the type described in my co-pending application Serial No. 612,984, filed August 27, 1945, now Patent No. 2,499,326, and entitled Registering Goniometer.

It will be seen that the receiving apparatus serves to measure at the location of the receiver the phase relation between the two 180 kilocycle signals derived respectively from the 60 kilocycle signals of the circular phase field pattern and the 90 kilocycle signals of the spiral phase field pattern, and that the indications given on the phase meter are therefore representative of the bearing of the transmitting apparatus from the receiver. However, in the illustrative example chosen, the frequency of the signals of the spiral phase field pattern has been doubled in the receiving apparatus which produces a corresponding doubling of any existing phase difference. Accordingly, the receiver which is illustrated in Fig. 5 would encounter two full electrical circles of phase change in circumnavigating the transmitting apparatus a single time, so that the system specifically described has a two to one ambiguity.

If it is desired to eliminate this ambiguity, the transmitting apparatus may be operated at frequencies bearing a two to one ratio to each other and by using the higher of the two frequencies to develop the spiral phase field pattern. By so doing it it unnecessary to subject the received signals of the spiral pattern to any frequency multiplication for phase measuring purposes.

On the other hand, since the accuracy of the indication given is more or less inversely proportional to the angular bearing encompassed by one full electrical circle of phase change, it is considered desirable to operate this system with an ambiguity of two to one and perhaps as much as four to one. Ambiguities of the order of magnitude of four to one are not serious for the reason that the pilot or navigator of a surface ship or aircraft will certainly know his position within one quadrant, and, if he does not, his position may be readily and quickly roughly determined by conventional navigational procedures.

I have illustrated in Fig. 6 an alternative form of transmitting apparatus for generating the hereinbefore described circular and spiral phase field patterns, the apparatus which is shown in Fig. 6 having the advantage of being somewhat simpler than the modification of the invention just described.

Radio frequency signals having a frequency, for example, of 60 kilocycles, are generated by a suitable oscillator 34 and applied to the input circuits of two 60 kilocycles power amplifiers 35 and 36. These power amplifiers are coupled as in the previously described modification to the antennae 10, 11, 12 and 13 at locations B, C, D and E. Between the oscillator 34 and the power amplifiers 35 and 36 there is interposed a phase shifting network comprising resistances 37, 38 and a condenser 39 serving to establish the required phase quadrature relationship between the output signals of the power amplifiers.

Across the input circuit of the amplifiers 35 and 36 I connect respectively coils 40 and 41 of a goniometer, the coils 40 and 41 being the stationary field coils of the goniometer and being disposed at right angles to each other. The third coil 42 comprising the rotating coil of the goniometer is connected to the input of an amplifier 43, the output of the amplifier 43 being connected to a final amplifier and modulator 44. The output of the amplifier 44 is coupled in a conventional manner to the antenna 3 at location A.

The modulating signal which is applied to the modulator 44 is derived from an audio-frequency oscillator 45, the output of which is also used to drive a small electric motor 46 which is mechanically connected to rotate the rotating coil 42 of the goniometer.

With the equipment described, it is possible to radiate from antenna 3 signals having a frequency differing slightly from the 60 kilocycle signals radiated from the other four antennae and to modulate these different frequency signals at a low frequency which is a harmonic of the difference between the two radiated frequencies. For example, the oscillator 45 may be adjusted to generate a frequency of 200 cycles per second and the drive ratio between the synchronous motor 46 and the goniometer 42 may be adjusted to add 50 cycles per second to the 60 kilocycle frequency induced in the goniometer coil 42 by the stationary coils 40 and 41. The amplifier 43 is therefore tuned to a frequency of 60,050 cycles per second, as is the modulator 44.

It will be seen that with this arrangement the frequency of the signals radiated from antenna 3 differs by 50 cycles from the frequency radiated from the remaining four antennae and also that the signals radiated from antenna 3 are modulated with a 200 cycle per second modulation. With this arrangement the beat frequency between the signals radiated from antenna 3 and those radiated from the remaining four antennae produces a spiral phase field pattern such as is illustrated in Fig. 3 in which the spacing between adjacent convolutions of the spiral is equal to one wavelength of the 50 cycle beat frequency. The 200 cycle modulation applied to antenna 3 produces a circular phase field pattern such as is illustrated in Fig. 4, in which the spacing between adjacent circles is equal to one wavelength at 200 cycles per second.

The signals generated by the transmitting apparatus shown in Fig. 6 may be utilised by employing a mobile receiving apparatus of the character shown in Fig. 7. This apparatus includes a receiving antenna 47 which is coupled as shown at 48 to a 60 kilocycle radio frequency receiver 49 having a sufficient band width to receive the 60,000 cycle signal from antennae 10, 11, 12 and 13, the 60,050 cycle carrier frequency from antenna 3 together with the lower and upper side bands of 59,850 and 60,250 cycles respectively.

The output of the receiver 49 is applied to a square law detector 50 which produces two output signals, namely a 50 cycle per second signal which is the beat frequency between the two radio frequencies transmitted, and a 200 cycle per second signal which is the modulation applied to the signals radiated from antenna 3. A square law detector is employed in preference to a linear detector to minimise the generation of fourth harmonics of the 50 cycle beat frequency.

The two output signals from the detector 50 are separated by filters 51 and 52 and the 50 cycle output signal from the filter 51 is multiplied to equality with the 200 cycle signal from the filter 52 by means of a frequency multiplier. The two resulting 200 cycle per second signals are applied to the input circuits of a phase discriminator 54 which is connected to a phase indicator 55 for measuring the phase relation between the two 200 cycle per second signals.

The phase discriminator 54 and the phase meter 55 are preferably of the type hereinbefore described.

As in the previously described modification, the phase meter readings are proportional to the bearing of the transmitting apparatus from the receiver location. However, the 50 cycle beat frequency which generates the spiral phase field pattern has been multiplied by a factor of four in the frequency multiplier 53 so that the change in phase reflected on the phase meter 55 is four times the change in bearing due to a given movement of the receiver. The system, therefore, has an ambiguity of four to one. However, as explained hereinbefore an ambiguity of this order of magnitude is not serious since the pilot or navigator of the mobile vehicle will ordinarily know or be able to determine his position within one quadrant.

In the modification of my invention which has been described in connection with Figs. 1 through 5, the bearing of the transmitting apparatus from the mobile receiver was determined by using the phase of the spiral phase field pattern as indicative of the bearing and by using the circular field pattern as a phase reference against which the phase of the spiral phase field signals could be measured.

It is obvious that radio frequency signals in a circular phase field pattern but radiated from a location different from that comprising the origin of the spiral phase field pattern could also be used as a phase reference providing the relation between that circular phase field and one concentric with the spiral phase field pattern were known.

This permits me to use the spiral phase field pattern as an adjunct to a conventional equi-phase displacement system for the purposes of lane identification, in which case use would be made of a master transmitter positioned at one location identified in Fig. 8 as location A, a normal equi-phase displacement system slave transmitter located at a different location B and surrounded by four other slave transmitters at locations B1, B2, B3 and B4, for producing a spiral phase field pattern concentric with the circular phase field pattern radiated from location B.

I have illustrated in Fig. 9 transmitting equipment which may be used to normally radiate from locations A and B signals of unlike but harmonically related frequencies for producing the equal equi-phase displacement field pattern and for from time to time radiating from locations B1, B2, etc., spiral phase field signals for lane identification purposes.

The master transmitting apparatus situated at location A may comprise a 60 kilocycle oscillator 56 which feeds a final amplifier and modulator 57, the output of which is applied in a conventional manner to a transmitting antenna 58 situated at location A.

An audio-frequency oscillator 59 may be connected through a switch mechanism 60 to the modulator 57 and the switch mechanism 60 may be connected as represented at 61 to a clock work 62 or other timing device for closing the switch 60 for short periods from time to time.

The signal radiated from antenna 58 thus comprises a 60 kilocycle carrier frequency which is from time to time for short periods modulated with an audio-frequency signal.

The slave transmitting equipment which is situated at location B may comprise a receiving antenna 63 coupled to a 60-kilocycle receiver 64, the output of which is applied to a frequency multiplier 65 serving to produce an output signal having a frequency of 180 kilocycles. The 180 kilocycle signal is divided by two in a divider circuit 66 to provide a 90 kilocycle signal which is passed through contacts 67 and 68 of a relay to be normally applied to an electronic phase controller 69. The output of the phase controller 69 is passed through a power amplifier 70 which is coupled in the conventional manner to an antenna 71 situated at location B.

A pick up loop 72 serves to pick up a small fraction of the 90 kilocycle energy applied to antenna 71. This pick up energy is multiplied to a frequency of 180 kilocycles by a frequency multiplier 73, the output of which is applied to one input circuit of a phase discriminator 74. The other input circuit of the phase discriminator 74 is connected as shown at 75 to the output of the frequency multiplier 65. The control potential generated by the phase discriminator 74 is applied as indicated at 76 to the electronic phase controller 69.

The apparatus thus far described operates to cause radiation from antenna 71 of continuous 90 kilocycle signals bearing a fixed multiple phase relation to the 60 kilocycle signals radiated from location A, thus establishing an equi-phase displacement field pattern in the known manner.

The output of the receiver 64 is applied also to a detector circuit 77, the output of which is connected to the coil 78 of the aforementioned relay. Whenever the clock work 62 operates to close the switch 60 so that a modulated signal is radiated from location A, the relay coil 78 is energised to throw the relay contacts 67 and 68 to their alternate positions to thereby connect the output of the frequency divider 66 to two phase controllers 79 and 80. The output of these phase controllers is applied respectively to power amplifiers 81 and 82 which are coupled respectively to antennae 83, 84, situated at locations B1, B2, and to antennae 85, 86, situated at locations B3, B4.

The pick up loops 87 and 88 associated with the output circuits of amplifiers 81 and 82 cooperate with frequency multipliers 89, 90, and phase discriminators 91, 92, to so regulate the operation of the phase controllers 79 and 80 as to maintain a proper phase relation between the signals radiated from the antennae 83—86, and to maintain the proper multiple phase relation between the 90 kilocycle signals of the circular phase field pattern and the 60 kilocycle signals radiated from location A.

It will be seen that during the time the 60 kilocycle signal is not modulated, a receiver such as is shown in Fig. 5 will indicate the line of position passing through the mobile receiver in the manner characteristic of the normal operation of an equi-phase displacement system.

It will also be appreciated that during the periods of transmission of a modulated signal from location A, a spiral phase field pattern is substituted for the circular phase field pattern normally radiated from location B.

The difference in phase between the normal 90 kilocycle circular pattern and the alternative 90 kilocycle spiral pattern at the location of the receiver is proportional to the bearing of location B from the location of the mobile receiver. This bearing may be directly measured on the receiver phase indicator by noting the magnitude of the phase shift resulting from the change in type of signal transmission. Such a difference is most easily observed by providing on the meter 33 a manually rotatable azimuth scale, the zero index of which is to be manually set to coincidence with the phase meter pointer during the normal operation of the system. The position of the needle during the alternative mode of operation then directly indicates on the azimuth scale the bearing of location B from the receiver.

It will be appreciated that for a complete navigation system a second set of slave transmitting equipment will be employed to establish the overlying and intersecting equi-phase displacement contours from which the location of the vehicle may be fixed.

During the alternative mode of operation the second set of slave transmitting equipment will provide a second bearing indication which is the bearing of the other location from the receiver. The intersection of these two lines of position will then identify the location of the receiver with sufficient accuracy to definitely identify the lane of the normal equi-phase displacement pattern within which the vehicle is located.

Figure 10:
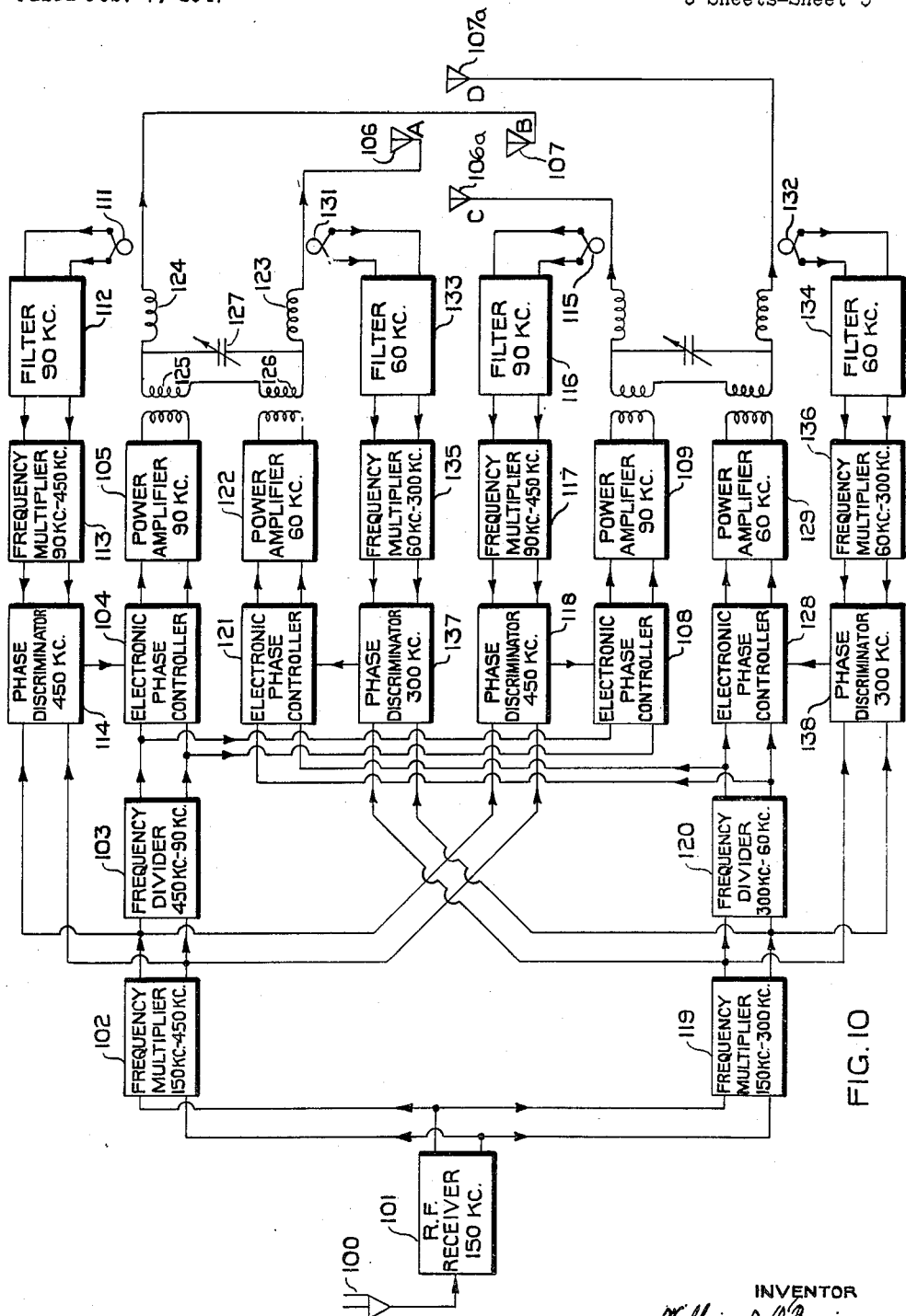
Fig. 10 is a block diagram illustrating transmitting equipment which may be employed to generate two superimposed spiral phase field patterns of opposite hand.

I have illustrated in Fig. 10 transmitting equipment which may be employed to generate simultaneously two spiral phase field patterns of opposite hand from which the bearing of a mobile receiver may be determined, the phase relation between the two patterns at the location of the receiver being employed in a manner analogous to that described hereinbefore in the employment of a spiral pattern and a circular pattern.

Since in certain navigational systems it may be desirable to use such counter-rotating spiral phase fields at a slave station location, I have illustrated in Fig. 10 slave type equipment including a receiving antenna 100 connected to a radio frequency receiver 101 tuned to the frequency of some other transmitting apparatus situated at a remote point, a frequency of 150 kilocycles being assumed for the purposes of illustration.

The output of the receiver 101 is divided into two channels, the first consisting of a frequency multiplier 102 serving to produce a 450 kilocycle signal which is divided in a frequency divider 103 to 90 kilocycles. The 90 kilocycle signal is fed through an electronic phase adjuster 104 and power amplifier 105 to transmitting antennae 106 and 107 situated at locations A and B respectively.

Figure 11:
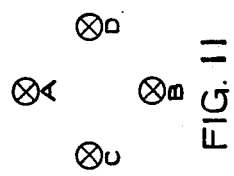
Fig. 11 is a diagram representing the arrangement of the transmitting antennae used with the transmitting equipment of Fig. 10.

The output of the frequency divider 103 is also applied to a phase controller 108, the output of which is passed through a power amplifier 109 and applied to transmitting antennae 106a and 107a situated at locations C and D respectively. The relative orientation of locations A, B, C and D may be as shown in Fig. 11.

Figure 12:
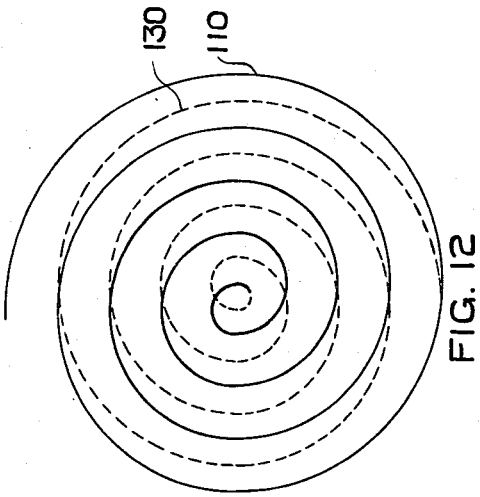
Fig. 12 is a diagram representing in plan view the two superimposed spiral phase field patterns generated by the transmitting apparatus of Fig. 10.

The apparatus thus far described serves to produce a spiral phase field pattern of the character illustrated by the solid line 110 in Fig. 12. This field pattern may be held in fixed spacial orientation by the use of suitable phase regulating equipment which may include a pick up loop 111 associated with the output of power amplifier 105 feeding through a 90 kilocycle filter 112 and frequency multiplier 113 to apply to one input circuit a phase discriminator 114 a 450 kilocycle signal. Another 450 kilocycle signal derived from the output of frequency multiplier 102 may be applied to the other input circuit of the phase discriminator 114 and this phase discriminator may be connected to control the operation of the electronic phase controller 104.

In a similar manner a pick up loop 115 associated with the output of power amplifier 109 may be connected through a 90 kilocycle filter 116 and frequency multiplier 117 to a phase discriminator 118, which is employed to regulate the operation of the phase controller 108.

The second channel to which the output of the receiver 101 is connected may comprise a frequency multiplier 119 serving to convert the 150 kilocycle input signal into a 300 kilocycle output signal. The 300 kilocycle output signal is converted to 60 kilocycles by a frequency divider 120 and is passed through a phase controller 121 and power amplifier 122 to antennae 106 and 107 aforementioned.

In the circuit feeding antennae 106 and 107 I insert inductances 123, 124, 125, 126 and a tuning condenser 127 adjusted to tune the circuits of antennae 106 and 107 simultaneously to frequencies of 60 and 90 kilocycles. The 60 kilocycle output of the frequency divider 120 is also passed through a phase controller 128 and power amplifier 129 and applied to the aforementioned antennae 108 and 109 in the manner similar to that described in connection with antennae 106 and 107. Antennae 108 and 109 are also tuned simultaneously to frequencies of 60 and 90 kilocycles.

The 60 kilocycle signals which are by the apparatus just described applied to the four transmitting antennae, serve to generate a spiral phase field pattern such as that represented by the dotted line 130 in Fig. 12. The opposite sense of rotation of the spiral 130 with respect to the spiral 110 is obtained by reversing the phase relationship between the 60 kilocycle signals applied to two of the antennae such as antennae 108 and 109 as compared with the phase of the 90 kilocycle signals applied thereto.

As in the case of the 90 kilocycle signals the 60 kilocycle spiral phase field pattern may be held in fixed orientation by the use of pick up loops 131, 132, feeding through 60 kilocycle filters 133, 134, and frequency multipliers 135, 136, serving to apply to one input circuit of each of two phase discriminators 137 and 138 300 kilocycle signals, the phase of which is compared by the discriminator with the phase of 300 kilocycle signals derived from the frequency multiplier 119.

The phase discriminators 137 and 138 are connected respectively to control the operation of the electronic phase regulators 121 and 128.

As a receiving apparatus one may use a receiver of the character illustrated in Fig. 5. It will be noted that in that receiver the phase measurement is made at a frequency which is equal to the least common multiple of the two transmitted frequencies, and that in order to convert the incoming signals to such least common multiple, it is necessary to multiply each incoming frequency by a unique factor of the frequency of the other signal. Thus a 60 kilocycle signal is subjected to a frequency multiplication of three, while the 90 kilocycle signal is subjected to a frequency multiplication of two. The measured phase shifts with respect to each pattern are multiplied in the receiver by factors equal to the multiplication ratios of the frequency multiplying circuits, and the ambiguity resulting from this multiplication is equal to the sum of the multiplying factors. Thus in the system specifically described there results an ambiguity of five to one. If the frequencies transmitted have a two to one ratio to each other the resulting ambiguity would be three to one.

While in the foregoing a description of the apparatus for producing the spiral phase field patterns has been limited to a case wherein use is made of four antennae with the phase relationships at the antennae increasing progressively around the array in 90° steps, it is to be realized that in a manner analogous to an electric motor, use may alternatively be made of 3, 6, 8 or more transmitting antennae spaced uniformly about a circle and with the phase change from antenna to antenna equal to a full electrical circle divided by the number of antennae employed.

From the foregoing it will be observed that I have provided a radio direction indicating system by means of which it is possible to indicate at the location of a mobile receiver by the use of relatively simple and inexpensive receiving apparatus, the bearing of a transmitting apparatus of known location.

I have also shown how this direction indicating system may be used as a navigation system per se, by providing simultaneous bearings of two transmitting locations from the location of the receiver. Attention is particularly directed to the use of the apparatus as alternative to normal equi-phase displacement systems by which means a lane identification with any desired degree of ambiguity, or no ambiguity at all, may be achieved.

While I have shown and described the preferred embodiment of my invention, I do not desire to be limited to the details of construction which have been illustrated and described herein except as defined in the appended claims.

I claim:

1. In a radio direction finding apparatus the combination of: four radio frequency transmitting antennae situated at the corners of a square; a first transmitting means for radiating from one pair of said antennae situated on one diagonal of said square radio frequency signals of like given frequency in phase opposition to each other; a second transmitting means for radiating from the other pair of said antennae radio frequency signals of said given frequency in phase opposition to each other and bearing a phase quadrature relation to the signals radiated from said one pair; a fifth radio frequency transmitting antenna spaced from each of said four transmitting antennae; and a third transmitting means for radiating from said fifth antenna other radio frequency signals of a frequency different than but harmonically related to said given frequency and bearing a fixed multiple phase relation thereto.

2. In a radio direction finding apparatus the combination of: four radio frequency transmitting antennae situated at the corners of a square; a source of radio frequency energy of given frequency means coupled to said source for radiating from one pair of said antennae situated on one diagonal of said square radio frequency signals having said given frequency but in phase opposition to each other; means coupled to said source for radiating from the other pair of said antennae radio frequency signals also having said given frequency and in phase opposition to each other but bearing a phase quadrature relation to the signals radiated from said one pair; a fifth radio frequency transmitting antenna situated at the centre of said square; a source of alternating current having a given modulation frequency; means coacting with said sources of radio frequency energy and alternating current for producing radio frequency signals of another frequency differing from said given radio frequency by an amount bearing a harmonic relation to said given modulation frequency; transmitting means for radiating from said fifth antenna said other radio frequency signals of said other frequency; and means coupled to said source of alternating current and to said transmitting means for modulating said other signals at said given modulation frequency, whereby said modulation frequency bears a harmonic relation to the difference in frequency between said signals of given frequency and said other signals.

3. In a radio direction finding apparatus the combination of: four radio frequency transmitting antennae situated at the corners of a square; means for radiating from one pair of said antennae situated on one diagonal of said square radio frequency signals of like given frequency in phase opposition to each other; means for radiating from the other pair of said antennae radio frequency signals of said given frequency in phase opposition to each other and bearing a phase quadrature relation to the signals radiated from said one pair; a fifth radio frequency transmitting antenna situated at the centre of said square; means for radiating from said fifth antenna other radio frequency signals of a frequency different than but harmonically related to said given frequency and bearing a fixed multiple phase relation thereto; a mobile receiving apparatus for receiving all of said signals, and means at said receiving apparatus for measuring and indicating the phase relation between the signals received from said four antennae and the signals received from said fifth antenna.

4. The method of determining direction of a mobile receiving apparatus from a radio transmitting apparatus of known location which includes the steps of radiating from said known location a first radio frequency signal in a directional pattern, rotating said directional pattern to establish a phase pattern of spiral form comprising the locus of all points of a given phase relation between said first signal at said point and at said location, radiating a second radio frequency signal in an omni-directional pattern to establish a phase pattern of concentric circular form comprising the loci of all points of given phase relation between said second signal at said points and at said location, said signals being of unlike but harmonically related frequencies, maintaining a fixed multiple phase relation between said first and second signals, and measuring at said receiving apparatus the multiple phase relation between said first and second radio frequency signals.

5. In a radio navigational system, the combination of: a first radiating means for providing a radiated signal of a given frequency; a second radiating means for providing a signal of a different frequency harmonically related to said given frequency; means for radiating said second signal in a spiral phase pattern and including more than two vertical radiating conductors disposed about a central point at equal distances therefrom and in uniform circumferential spacing thereabout, the phase difference between the exciting current of adjacent conductors being equal to the angle formed by two lines extending to said conductors from said central point, said angle thereby being equal to or less than 120 degrees; a mobile receiver including means for receiving said radiated signals to produce separate amplified signals of said given frequency and said different frequency; frequency changing means including a frequency multiplier for producing a pair of like frequency signals from said amplified signals, said like frequency signals having a phase difference indicative of the multiple phase relation between the received signals of said given frequency and said different frequency; means for measuring and indicating the phase difference between said like frequency signals; and means for converting the information given by said indicating means to provide a compass bearing from the location of said mobile receiver to said means for radiating said second signal.

6. A radio direction finding apparatus according to claim 1 wherein said fifth transmitting antenna is situated outside of said square; a sixth radio frequency transmitting antenna situated at the center of said square; a fourth transmitting means for radiating from said sixth antenna radio frequency signals of said given frequency bearing a fixed multiple phase relation to said other radio frequency signals of different frequency; and control means coacting with said first, second, and fourth transmitting means for normally operating said fourth transmitting means while holding said first and second transmitting means inoperative, said control means being operable to arrest operation of said fourth transmitting means and initiate operation of said first and second transmitting means.

7. In a radio direction finding apparatus the combination of: four radio frequency transmitting antennae situated at the corners of a square; a first transmitting means for radiating from one pair of said antennae situated on one diagonal of said square radio frequency signals of like given frequency in phase opposition to each other; a second transmitting means for radiating from the other pair of said antennae radio frequency signals of said given frequency in phase opposition to each other and bearing a phase quadrature relation to the signals radiated from said one pair; and a third transmitting means for radiating other radio frequency signals of a frequency different from but harmonically related to said given frequency, and bearing a fixed multiple phase relation thereto.

8. A radio direction finding apparatus according to claim 7 wherein said third transmitting means is also coupled to said four antennae to radiate from said one pair of antennae said radio frequency signals of said other different frequency in phase opposition to each other and to radiate from said other pair of antennae said radio frequency signals of said other different frequency in phase opposition to each other and in phase quadrature to said other signals of different frequency radiated from said one pair of antennae, whereby the instantaneous phase loci of said signals of said given frequency and said signals of said other different frequency constitute spiral field patterns of opposite hands.

WILLIAM J. O'BRIEN.

REFERENCES CITED

The following references are of record in the file of this patent:

UNITED STATES PATENTS

| Number | Name | Date |
|---|---|---|
| 1,815,246 | Englund | July 21, 1931 |
| 1,922,677 | Greig et al. | Aug. 15, 1933 |
| 1,933,248 | Evans et al. | Oct. 31, 1933 |
| 2,129,004 | Greig | Sept. 6, 1938 |
| 2,252,699 | Byrne | Aug. 19, 1941 |
| 2,328,476 | Luck | Aug. 31, 1943 |
| 2,377,902 | Relson | June 12, 1945 |
| 2,394,157 | Earp | Feb. 5, 1946 |
| 2,404,196 | Seeley | July 16, 1946 |
| 2,422,110 | Luck | June 10, 1947 |
| 2,430,244 | O'Brien | Nov. 4, 1947 |
| 2,511,030 | Woodward | June 13, 1950 |

FOREIGN PATENTS

| Number | Country | Date |
|---|---|---|
| 620,488 | Great Britain | Mar. 25, 1949 |